Sept. 14, 1948.    R. C. GUPTON    2,449,220
COOLING NOZZLE FOR USE IN WELDING
Filed Aug. 30, 1944
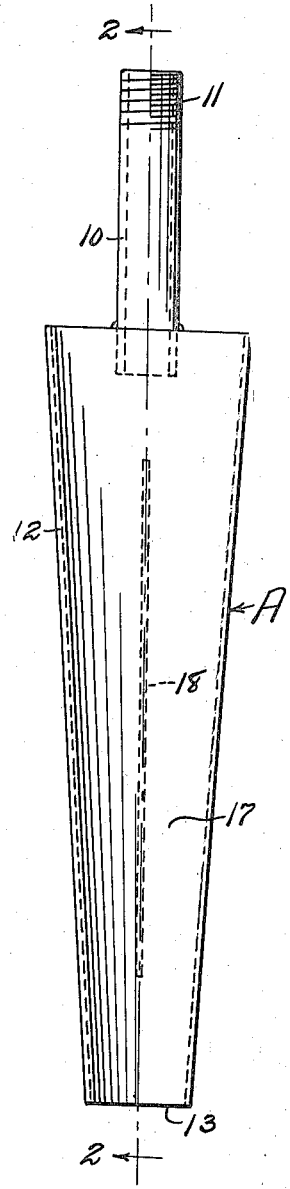
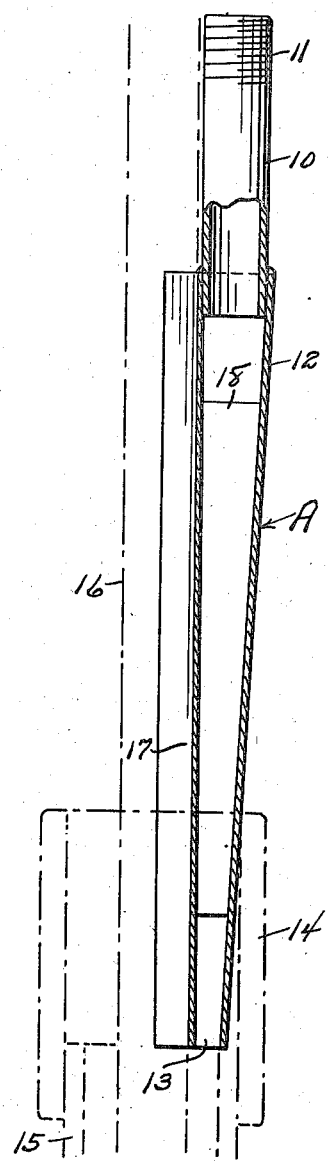
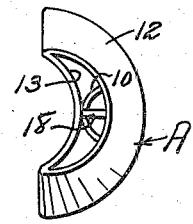
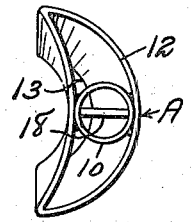
INVENTOR.
Ronda C. Gupton
BY Victor J. Evans & Co.
ATTORNEYS Patented Sept. 14, 1948

2,449,220

UNITED STATES PATENT OFFICE 2,449,220

COOLING NOZZLE FOR USE IN WELDING

Ronda C. Gupton, Newport News, Va.

Application August 30, 1944, Serial No. 551,955

1 Claim. (Cl. 113—98)

The invention relates to a protective device for use in welding metal structures, such as kick pipes or tubes to ship decks or bulkheads, and more especially to a cable weld protector device.

The purpose of this invention is to provide a cable weld protector nozzle head having converging arcuate walls with the ends open, wherein air, water, or other fluid supplied, under pressure, through the larger end draws air in through openings in said end into a mixing chamber and ejects the fluids through a restricted diffusing chamber in the smaller end.

The primary object of the invention is the provision of a device of this character, to be used where cable runs through kick pipes or tubes and during the welding of the latter, for the protection of such cable under the welding activity, the said device eliminating the labor and time for removing the cable and avoids burning thereof during the welding operation.

Another object of the invention is the provision of a device of this character, wherein its construction renders it especially useful for protecting cables in the welding of the piping or tubing which surrounds the cable during ship construction or repairs thereto.

A further object of the invention is the provision of a device of this character, wherein the welding operation can be done with dispatch and without danger to a cable, thereby saving man-hours and expense in this connection.

A still further object of the invention is the provision of a device of this character, which is simple in construction, thoroughly reliable and efficient in operation, strong, durable, readily and easily handled, susceptible of proper fitting with the work, and inexpensive to manufacture and install.

With these and other objects in view, the invention consists in the features of construction, combination and arrangement of parts as will be hereinafter more fully described, illustrated in the accompanying drawing, which shows the preferred embodiment thereof, and pointed out in the claim hereunto appended.

In the accompanying drawing:

Figure 1 is a front elevation of the device constructed in accordance with the invention.

Figure 2 is a sectional view taken on the line 2—2 of Figure 1 looking in the direction of the arrows.

Figure 3 is an end view thereof looking toward the discharge end.

Figure 4 is an end view looking toward the intake end of the head.

Similar reference characters indicate corresponding parts throughout the several views in the drawing.

Referring to the drawing in detail, A designates generally the device in its entirety as constructed in accordance with the invention. The device A comprises a nipple 10 for connection with a water or air hose, not shown, and such air or water is adapted to be under pressure through the medium of any suitable source. This nipple 10 has the threaded outer end 11 for the connection of the hose therewith.

The nipple 10 is permanently mounted in an elongated substantially crescent shaped hollow protector head 12, which is provided with openings at each side of the nipple and inwardly tapered from the end in which the said nipple is mounted in the direction of its length, while the smaller end of this head effects a nozzle 13, the latter being adapted to be protruded within a coupling sleeve or union 14 on a kick pipe or tube 15, which may have a cable as indicated by the dotted line 16 therein, and this tube or pipe 15 is welded to a ship's deck or bulkhead, not shown, the head 12 at the channel face 17 partly encircling the said cable 16, to protect the same from burning during the welding operation of the tube or pipe.

Within the hollow of the head 12 is a partition 18, which terminates at points spaced from opposite ends of such head, and in this way the latter is internally reinforced against collapse, and provided with a mixing chamber at the upper end and a diffusing chamber at the lower end.

In the use of the device, A, after placement in the manner as best seen in Figure 2 of the drawing, the water or air under pressure is delivered to the head 12, whence it will flow therethrough drawing air in around the nipple, and in this way the cable will be prevented from burning during the welding of the pipe or tube, as before stated, to a ship's deck or bulkhead. This procedure relieves the necessity of removal of the cable from the pipe or tube, and is a protection to the said cable.

What is claimed is:

As an article of manufacture, a cooling fluid injector nozzle comprising an elongated casing open at the ends providing a nozzle head crescent shape in cross section having arcuate inner and outer walls connected at the edges and having a centrally disposed longitudinally positioned partition connecting the inner and outer walls midway between the edges thereof, the ends of the partition being spaced from the ends of the casing providing a mixing chamber at the inlet end and a diffusing chamber at the outlet end, the cross sectional area of said casing being gradually reduced toward the discharge end increasing the velocity of fluid passing therethrough, and a centrally disposed nipple providing a connector for fluid supplying means extending from the inlet end of the casing with open areas in the inlet end on each side of the nipple through which air is drawn into the casing by fluid from the nipple passing therethrough.

RONDA C. GUPTON.

REFERENCES CITED

The following references are of record in the file of this patent:

UNITED STATES PATENTS

| Number | Name | Date |
|---|---|---|
| 157,256 | Wiard | Nov. 24, 1874 |
| 577,362 | Ettlinger | Feb. 16, 1916 |
| 1,186,117 | Moe | June 6, 1916 |
| 2,039,217 | Goddard | Apr. 28, 1936 |
| 2,259,367 | Ely et al. | Oct. 14, 1941 |
| 2,314,078 | Crawford | Mar. 16, 1943 |

FOREIGN PATENTS

| Number | Country | Date |
|---|---|---|
| 655,286 | Germany | 1938 |